Sept. 15, 1959     R. O. WYNN     2,904,059

LUBRICATED GATE VALVE

Filed Sept. 16, 1954

INVENTOR
Robert O. Wynn
BY    Lee B. Kenon
ATTORNEY

United States Patent Office 2,904,059
Patented Sept. 15, 1959

2,904,059

LUBRICATED GATE VALVE

Robert O. Wynn, Houston, Tex., assignor, by mesne assignments, to ACF Industries, Incorporated, a corporation of New Jersey Application September 16, 1954, Serial No. 456,567

3 Claims. (Cl. 137—246.12)

This invention relates to valves, and more particularly to through conduit gate valves of the type in which the gate is laterally expansible into sealing position with its seats in both the open and closed positions of the valve.

Lubrication of valves of this type presents specific problems. The abutting faces of the seats and the gate assembly should be lubricated in order to reduce wear. In addition, it is necessary to provide a liquid seal at least on the downstream side to insure against leakage in high pressure operation.

The principal object of this invention is to provide for line pressure actuated automatic lubrication and sealing of the downstream side of gate valves.

It is a further object to provide a lubrication system which is received entirely within the valve and yet provides access to the lubricant reservoir from the exterior of the valve body.

A further object is to provide a valve which may be placed in line without reference to the direction of fluid flow therein.

Other objects will be apparent from the following description read in conjunction with the attached sheet of drawing, in which.

Figure 1:
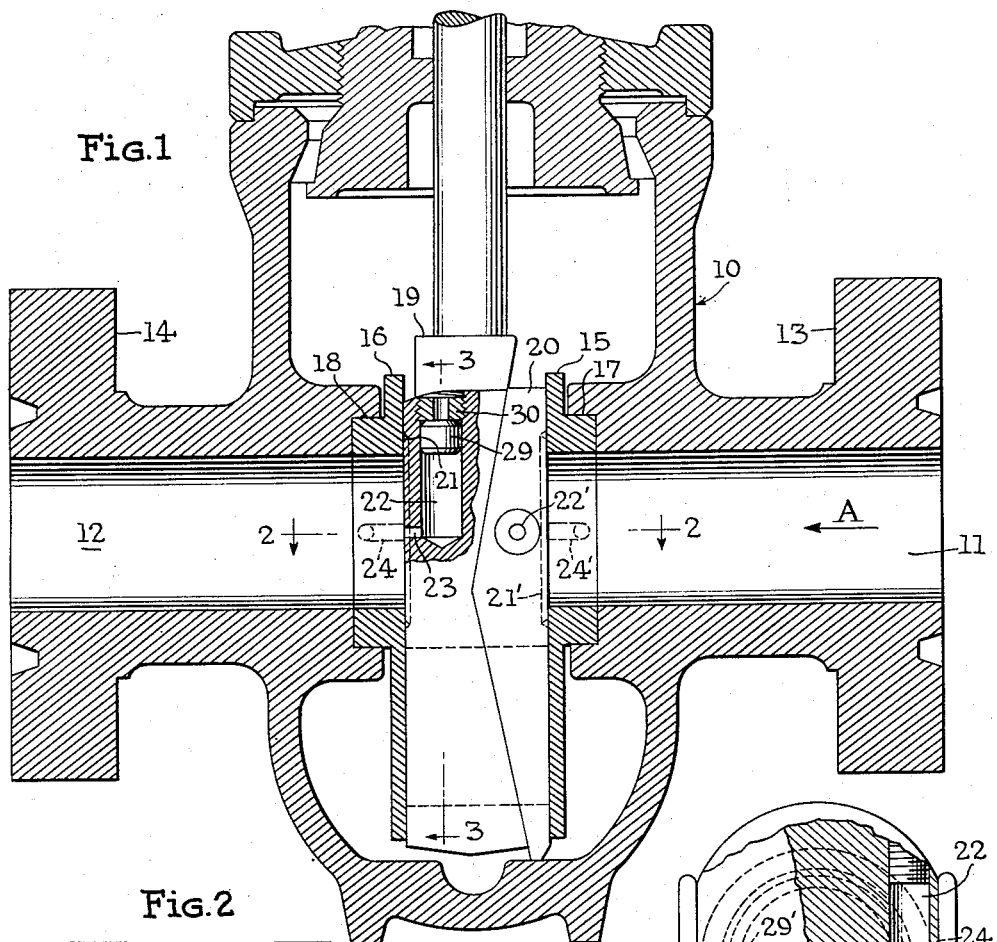
Figure 1 is a side elevation partly in section of a valve embodying this invention.

The valve body 10 includes a pair of aligned flow passages 11 and 12. Surrounding the outward ends of these passages are conventional flanges 13 and 14 to provide for connection of the valve in a fluid line. The valve seats 15 and 16 are machined to be received with a snug fit in the counterbores 17 and 18 interiorly of the valve body. The valve bonnet, stem, seal and packing are conventional and form no part of the instant invention. As shown, however, the valve is of the rising stem type. The valve member or gate assembly, as it will be hereinafter referred to, comprises a pair of complementary elements which will be hereinafter referred to as the gate 19 and segment 20. By reason of the angular relationship between the adjoining surfaces of these latter two members, it will be obvious that relative movement between the two in the direction of movement of the gate assembly results in changes in the lateral dimension of the gate assembly giving a wedging action forcing the valve gate assembly onto its seats. The valve, therefore, may be sealed in both open and closed positions.

The lubrication system which constitutes the subject matter of this invention includes an annular groove 21 in the seating surface of the gate member 19, and it will be seen that this groove surrounds the flow passage 12 when the valve is in its closed position. Received entirely within the gate 19 is a lubricant reservoir 22. At its lower end, this reservoir is connected via a bore 23 to the seat 16 and also through bore 24 to the groove 21.

Figure 2:
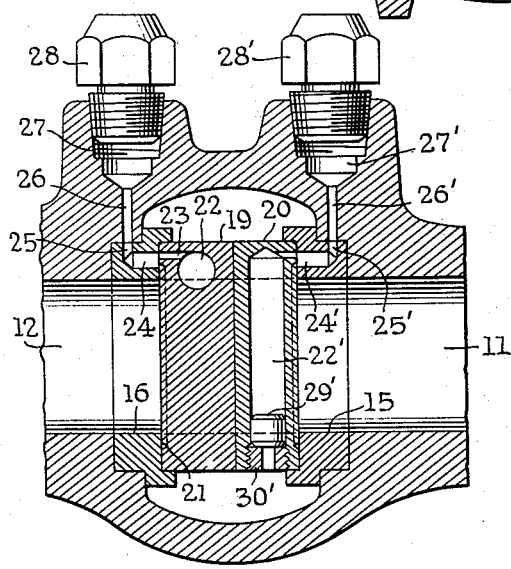
Figure 2 is a sectional view on line 2—2 of Figure 1.
Figure 3:
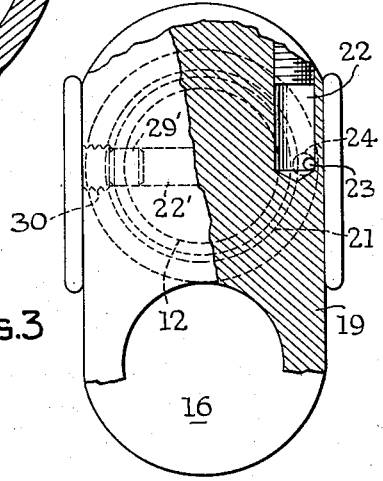
Figure 3 is a view partly in section on line 3—3 of Figure 1.

The seat 16 is bored at 24 and 25, as shown most clearly in Figure 2, to connect with a bore 26 which extends through the body 10. The outer enlarged end 27 of the bore 26 may conveniently receive a lubricant fitting 28. Whenever, therefore, the valve is in the closed position, as shown in the drawings, the lubricant reservoir 22 within the gate 19 may be filled through the lubricant fitting 28 and bores 26, 24 and 23. The first movement of the gate 19 toward open position unwedges the parts and will move 23 out of register with bore 24 and the reservoir can no longer be either filled or discharge to groove 21. Since the valve gate segments 19 and 20 will have moved slightly off of their seats due to the unwedging action, equal pressure will act on the lubricant in the reservoir through passages 23 and the central bore of 30. Received within the reservoir 22 is a sliding piston 29. This piston is restrained from moving upwardly beyond a predetermined point in the reservoir by means of a centrally bored annular plug 30 which may be conveniently screw-threaded into the reservoir 22. When the reservoir is full of lubricant, therefore, the piston 29 will be forced against the member 30. The upper end of the reservoir 22 is in free communication with the interior of the valve body. The lower end of the reservoir, as previously stated, is sealed off from bore 24 and annular groove 21 at all times except when the valve is fully closed and 24 connects 23 and 21. The lower end will also be in communication with the interior of the valve body when the gate segments have shifted allowing the gate segments to retract from the body seats.

In order that the valve may be placed in the line without reference to the direction of fluid flow therein, the above described lubrication system is duplicated on the opposite side of the valve. In view of the limited space available in the segment 20, the lubricant reservoir 22' is positioned tranversely within the segment at right angles to the longitudinal axis of the reservoir 22 in the gate 19. Otherwise, the structure is identical to that previously described, and the reference numerals correspond, being identified by the addition of a prime (') in each case.

The operation is as follows:

Assume that fluid flow is in the direction indicated by the arrow A in Figure 1. Seat 16 is, therefore, the downstream seat. If the valve is in its closed position, as shown in the drawings, any fluid which leaks around the upstream seat 15 will enter the interior of the valve body and therefore fluid pressure within the valve body will correspond substantially to that in the upstream line. Inasmuch as the upper end of the reservoir 22 is in free communication with the interior of the valve body, line pressure will be exerted through the annular member 30 and on the piston 29. This in turn will force the piston downwardly to force lubricant through the bore 23 and 24 into the groove 21 which surrounds the outlet port in seat 16. Since the lubricant within the groove 21 is under line pressure, this will effect a complete fluid seal of the downstream side. In the event that the downstream side is leaking, more lubricant will be forced into the groove 21 in order to maintain the seal. It should be noted that once all lubricant passages are full, there is a flow of lubricant from the reservoir to the groove 21 only if there is some slight leakage at the downstream seat. Otherwise, there would be no need for additional lubricant as a seal.

Whenever the valve is moved from closed to open position, the small amount of lubricant which is locked in groove 21 will be smeared between the seat 16 and the gate 19, and this will reduce wear on the adjoining surfaces of these two members. The lubricant reservoir may of course be refilled only when the valve is placed in its closed position, because only then will the gate bore 23 be aligned with the seat bore 24. Also, groove 21 can only be charged with lubricant when the valve is in fully closed position.

The piston 29 serves to transmit line fluid pressure from the interior of the valve body to the lubricant in the reservoir. Additionally, it prevents channeling of the lubricant by the line fluid.

In the event that fluid flow in the valve is in a direction opposite to that indicated by the letter "A" in Figure 1, seat 15 becomes the downstream seat. Reservoir 22' in the segment 20, then performs a function identical to that described above with reference to gate reservoir 22.

It should be noted that leakage around the upstream seat will not result in bleeding of the lubricant from the upstream reservoir due to the fact that pressure on both sides of this reservoir will be balanced.

From the foregoing, it will be apparent to those skilled in the art that there is herein shown and disclosed, a new and useful lubrication and sealing system for gate valves. It will be equally apparent that there are many possible equivalent structures within the scope of the appended claims.

I claim:

1. A line pressure actuated automatic lubrication system for a through conduit gate valve, said valve being of the type in which the valve member includes a gate and segment laterally expansible to seal the valve in both open and closed positions, comprising in combination: said valve; means defining annular lubricant receiving grooves in the seat contacting faces of the valve member, said grooves being positioned to surround the valve seat ports when the valve is in closed position; a pair of lubricant reservoirs, one positioned entirely within the gate and the other positioned entirely within the segment of the valve member, one end of said reservoirs being in free communication with the interior of the valve body, and the opposite ends of said reservoirs being connected to the respective gate and segment faces in spaced relation to said grooves; a pair of pistons, one slidably received within each of said reservoirs, serving as a barrier between the lubricant and the valved fluid; means defining a first pair of bores in the valve seats, one end of said bores opening into the valve member contacting faces of said seats and so positioned as to be in communication with said opposite ends of said reservoirs and with said annular grooves when the valve is in closed position; means defining a second pair of bores in said seats, one end of said bores being in communication with said first bores; means defining a third pair of bores in the valve body, said third pair of bores extending interiorly from points on the exterior of said body to connect with said second pair of bores in said seats; and a pair of lubricant filler fittings, one closing the exterior of each of said body bores; whereby when said valve is in closed position, said reservoirs may be filled through said fittings.

2. A line pressure actuated automatic lubrication system for a through conduit gate valve comprising in combination, a valve body having aligned flow passages with valve seats thereabout, a gate assembly including a gate and segment laterally expansible to seal the conduit in both directions and reciprocable within the valve body, means defining a lubricant receiving groove in the seat contacting faces of said gate assembly when the valve is in closed position, a pair of lubricant reservoirs, one positioned entirely within the gate and the other positioned entirely within the segment of the valve member, one end of said reservoirs being in free communication with the interior of the valve body, and the opposite ends of said reservoirs being connected to the respective gate and segment faces in spaced relation to said grooves; a pair of pistons, one slidably received within each of said reservoirs, serving as a barrier between the lubricant and the valved fluid; means defining a pair of bores in the valve seat, said bores being relatively large and having the interior ends opening into the contacting faces of said seats and so positioned as to be intersected by said grooves and communicating at space points with the adjacent ends of the reservoirs when the valve is in closed position, and a pair of lubricant fillers in communication with said pair of bores whereby when said valve is in closed position said grooves and said reservoirs may be simultaneously filled.

3. A line pressure actuated automatic sealant system for a through conduit gate valve comprising in combination, a valve body having aligned flow passages with valve seats thereabout, a gate member assembly reciprocable in said body having a portion provided with a port to align with said flow passages in the open position and a solid portion prohibiting flow in the closed position, said gate member assembly initially isolating said valve body from said flow passages in both open and closed positions, means defining a sealant receiving groove in the seat contacting faces of said gate assembly when the valve is in the closed position, a pair of sealant reservoirs, one end of said reservoirs being in free communication with the interior of said body, the opposite end of said reservoirs being connected to seat contacting faces of said gate assembly in spaced relation to said grooves, the reservoirs being so positioned that each reservoir is independently connected to a single face, a pair of pistons, one slidably received within each of said reservoirs serving as a barrier between the fluids in the body and the reservoir, means defining a pair of bores in the valve seats, said bores being relatively large and having the interior ends opening into the contacting faces of said seats and so positioned as to be intersected by said grooves and communicating at spaced points with the adjacent ends of the reservoirs when the valve is in closed position, and a pair of sealing fillers in communication with said pair of bores whereby when said valve is in closed position said grooves and said reservoirs may be simultaneously filled.

References Cited in the file of this patent

UNITED STATES PATENTS

| 2,002,647 | Sorensen | May 28, 1935 |
| 2,269,887 | Sharp | Jan. 13, 1942 |
| 2,276,620 | Harrington | Mar. 17, 1942 |
| 2,433,638 | Volpin | Dec. 30, 1947 |
| 2,568,935 | Smith | Sept. 25, 1951 |
| 2,570,413 | Volpin | Oct. 9, 1951 |